United States Patent

[11] 3,584,429

| [72] | Inventor | Roy Sidney Wadlow<br>Steyning, Sussex, England |
|---|---|---|
| [21] | Appl. No. | 745,898 |
| [22] | Filed | July 18, 1968 |
| [45] | Patented | June 15, 1971 |
| [73] | Assignee | Link-Miles Limited<br>Sussex, England |
| [32] | Priority | July 20, 1967 |
| [33] | | Great Britain |
| [31] | | 33486/67 |

[54] ANGULAR POSITIONING APPARATUS FOR VEHICLE SIMULATOR
7 Claims, 3 Drawing Figs.

[52] U.S. Cl. .................................................. 35/12, 318/13
[51] Int. Cl. ...................................................... G09b 9/08
[50] Field of Search ........................................... 35/12, 11; 318/8, 13; 91/381

[56] References Cited
UNITED STATES PATENTS

| 1,865,828 | 7/1932 | Buckley | 35/12 |
| 2,946,938 | 7/1960 | Gavreau et al. | 318/8 X |
| 3,246,218 | 4/1966 | Centner et al. | 318/8 |
| 3,344,993 | 10/1967 | Wilder et al. | 91/381 X |

Primary Examiner—Robert W. Michell
Assistant Examiner—Paul V. Williams
Attorney—Sughrue, Rothwell, Mion, Zinn and MacPeak ABSTRACT: A simulator system comprising a device for simulating a vehicle, a support on which the simulator device is mounted for movement relative to the support, and apparatus for positioning the simulator device with respect to the support. In the positioning apparatus, an output shaft of a differential gear has a load driven thereby. The differential gear has two input shafts normally driven at equal speed so that the output shaft is stationary. The position of the load is changed by temporarily making the input shaft speeds unequal. To control the load position, a signal representing the actual position of the output shaft is obtained and compared with a reference signal representing the desired shaft position to derive an error signal. The speed of one of the input shafts is controlled by the error signal so that the output shaft is driven to adopt a position dependent on the reference signal.

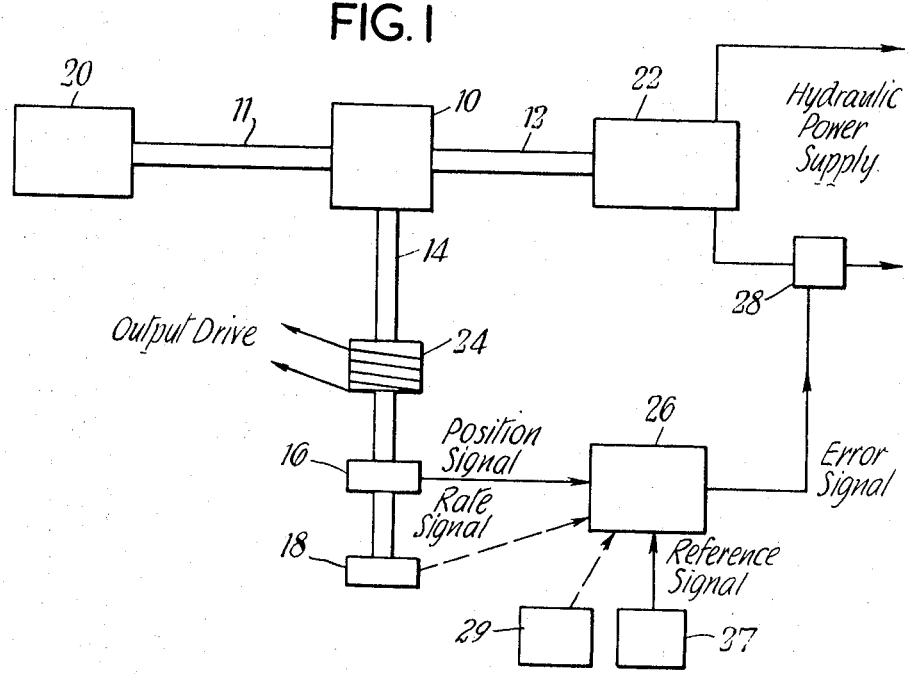
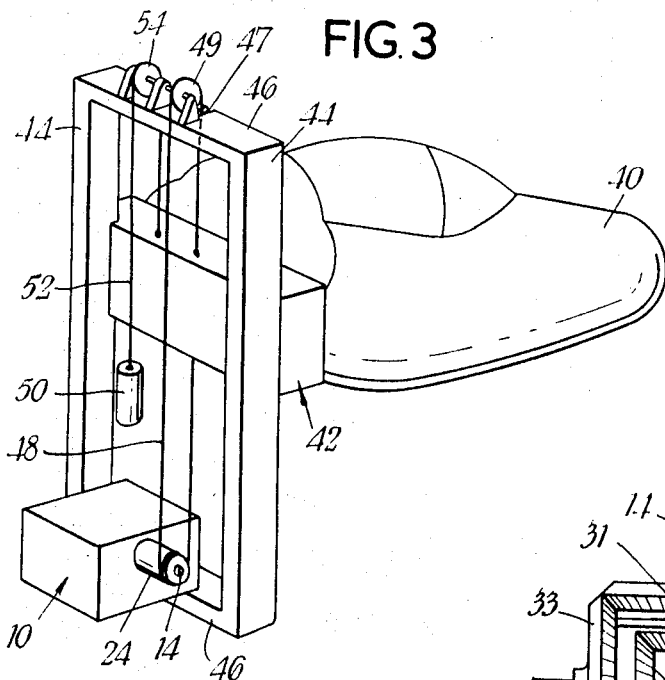
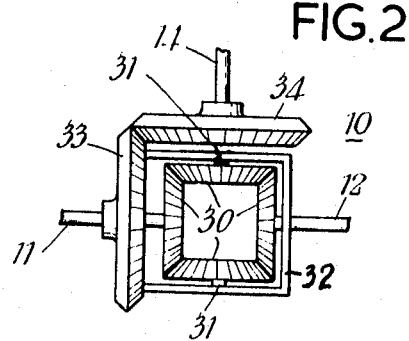

ANGULAR POSITIONING APPARATUS FOR VEHICLE SIMULATOR

The present invention relates to angular positioning apparatus and is particularly concerned with the application of such apparatus to a drive system of an aircraft or like simulator.

The invention is based on the realization that when using a differential gear the angular position of the output shaft can be maintained constant by maintaining the rates of rotation of the two input shafts the same (assuming each input shaft has the same gear ratio to the output shaft), and that changes in the angular position of the output shaft can be made by having a temporary difference in the rates of rotation of the input shafts until a desired angular position of the output shaft is obtained. By controlling this difference in the rates of rotation of the input shafts from an error signal derived from a signal representing the actual angular position of the output shaft and a desired position-representing signal the position of the output shaft is controlled in dependence upon the desired position-representing signal.

Accordingly the present invention provides positioning apparatus comprising first and second input shafts, an output shaft and a differential gear coupling said first and second shafts to said output shaft to rotate the latter at a rate dependent on the difference between the rates of rotation of said first and second input shafts; means responsive to the movement of said shaft or of a load coupled thereto to derive a signal representing the angular position of said shaft or position of said load respectively; means responsive to said position-representing signal to compare the latter with a reference signal and derive an error signal from said comparison; and first and second means coupled to apply drive to said first and second input shafts respectively, said first means being responsive to said error signal to control the rate of rotation of said first input shaft such that said shaft or said load adopts a position dependent on said reference signal.

In order that the invention and manner of putting it into practice may be better understood, an embodiment thereof will now be described, by way of example, with reference to the accompanying drawings in which:

FIG. 1 illustrates in block diagram form angular positioning apparatus of the invention;

FIG. 2 shows, in diagrammatic form, a preferred differential gear for use in the apparatus of FIG. 1; and FIG. 3 illustrates the application of the apparatus of FIG. 1 to an aircraft simulator.

Turning to FIG. 1, a differential gear 10 has input shafts 11 and 12 and an output shaft 14 and it will be assumed that the gear ratio from each of the input shafts to the output shaft is 1:1 though other ratios can be used with appropriate adjustment of the relative rates of rotation of the input shafts. Input shaft 11 is driven by an electric motor 20 and input shaft 12 is driven by a hydraulic motor 22, though it will be apparent that any combination of motor-types can be used. The output shaft 14 has a drive pulley 24 fixedly mounted thereon for taking-off drive to a load to which further reference is made below. Any form of drive takeoff from the shaft 14 may be employed. Also mounted on the shaft 14 is a potentiometer 16 having its slider coupled for movement with the shaft and from which is derived a voltage representing the actual angular position of the shaft in a well-known manner and needing no further description here. The voltage derived from the potentiometer is compared by means 26, such as a computer, with a reference voltage representing a desired position of the output shaft and provided by a source 27. An error signal is obtained from this comparison and is used to control a continuously variable servo valve 28 which may adopt any position between a fully open and fully closed position and which is placed in the hydraulic power circuit of the hydraulic motor 22 and controls the speed of rotation of the latter. A servo loop is thus established, the valve 28 being approximately halfway open for a zero error signal at which condition the hydraulic motor has the same speed as the electric motor. It is assumed that the electric motor is driven at constant speed.

The operation of the apparatus is as follows: the output shaft 14 will be stationary when the two input shafts 11 and 12 are rotating at the same speed and therefore the output shaft can be maintained at any angular position whatever the speed of the input shafts may be. The servo loop acts to maintain the error signal at zero, so that any change in the value of the reference signal creates an error signal which, depending on the polarity of the error signal, opens or closes the servo valve 28, and drives the hydraulic motor faster or slower thus turning the output shaft 14. As the shaft 14 turns and the signal from the potentiometer approaches the reference signal, the error signal falls and thus the speed differential of the two motors 20 and 22 is reduced until motor 22 again runs at the same speed as motor 20.

An additional feature which may be desirable in assisting the stability and damping of the servo loop is to mount a tachometer 18 on the output shaft 14 to develop a signal representing the rate of turn of the output shaft. This signal is used by the comparison means 26 to modify the value of the error signal as the shaft 14 turns as is well-known in servo technique.

A preferred differential gear 10 of FIG. 1 is illustrated diagrammatically in FIG. 2 and comprises four bevel gearwheels 30 of the same size, two opposite ones of which are mounted to rotate about axles 31 mounted in a frame 32. The other two of the four gearwheels 30 are mounted on respective ones of the input shafts 11 and 12, the latter extending through an aperture in the frame. A further bevel gearwheel 33 is fixed to the frame 32 to rotate therewith about a common axis with the shafts 11 and 12. The shaft 11 extends through an axial aperture in gear 33. A final bevel gearwheel 34 engages the gearwheel 33 and transmits rotation of the frame 32 in response to a difference in the rates of rotation of the input shafts to the output shaft 14 upon which the gearwheel 34 is fixedly mounted. It will be realized that any other form of differential gear could be used, for example, one using spur gears.

In the above described apparatus, the means 16 for deriving a signal representing the angular position of the shaft 14 was a potentiometer and this is advantageous in deriving an analogue signal for use with an analogue computer. If a digital computer is used to control the apparatus, the potentiometer may be replaced by a digital shaft-position encoder providing signals directly useable by the digital computer.

The means 16 could also be a combination of a device such as a tachometer for producing a signal representing the angular velocity of shaft 14 together with an integrator acting on the angular velocity signal to produce the angular position signal.

Furthermore the means 16 need not be directly coupled to the movement of shaft 14 but be indirectly coupled thereto by, for example, responding to the movement of a load driven by the shaft.

The above description referred to a continuously adjustable servo valve but the apparatus could use a servo valve actuable in discrete steps. For example, if it were only necessary to control the shaft 14 to be between prescribed angular positions, a step actuation of the servo valve whenever a prescribed limit was exceeded could be used to restore the shaft to be within the limit.

While the invention is generally applicable for controlling the position of an output shaft or of a load driven from such a shaft, especially where considerable drive power is required coupled with the necessity of a fast response, the invention finds particular application in the field of aircraft simulation. This is illustrated in FIG. 3 and will now be described.

In FIG. 3, there is shown in diagrammatic form the cockpit 40 of an aircraft as would be made up for a simulator. The cockpit is mounted on a movable carriage shown diagrammatically and denoted by reference numeral 42. The carriage is carried by a frame comprising uprights 44 rigidly joined to crosspieces 46. The carriage 42 is guided by guideways not shown of the frame and in the arrangement shown the rear portion of carriage 42 enters between uprights 46. The carriage 42 and cockpit 40 thus are movable vertically relative to the frame and drive is applied to the carriage by a cord 48. One end of the cord 48 is attached to the upper part of the carriage 42 which rises over a pulley 49 through a slot 47 in the upper crosspiece 46, and descends at the rear of the frame where it passes in a few turns over pulley 24 mounted on output shaft 14 of the differential gear 10 of the apparatus of FIG. 1. After leaving the pulley 24 the cord 48 rises and its other end is fastened to the lower part of carriage 42. The differential gear 10 is fixed relative to the frame 44, 46.

In order to reduce the standing load on the drive system a counter balance weight 50 is attached to one end of a cord 52 which passes over a second pulley 54 on the upper crosspiece 46 and which has its other end fastened to the carriage 42.

The vertical position ("heave"axis position) of the cockpit is controlled by the apparatus of FIG. 1 and it will be appreciated that a second system can be installed to act at right angles to that described and provide "sway" axis motion. Another system such as in FIG. 1 can be used to provide "roll" motion for the cockpit which in this case would be mounted to rotate with shaft 14 about the longitudinal axis of the simulated aircraft.

The apparatus described can be made to control loads of up to 10,000 lbs. or so and the movement provided in an arrangement such as shown in FIG. 3 may be between 2 and 10 feet although displacements of up to 40 feet may be feasible.

The potentiometer 16 of FIG. 1 can be driven, if desired, by the actual motion of the carriage 42 using a rack-and-pinion or cord drive for this purpose. In this way the actual position of the load is monitored directly.

A drive system, such as has been described, has particular advantages in a simulator in that the angular excursion of the output shaft can be made large for large excursions of the cockpit and can be almost unlimited by using a multiturn potentiometer. Because the two motors are rotating constantly, upon drive being required for the simulator there is no motor inertia to overcome in the same way as when the drive motor is started from a stationary position, nor variations in motor torque as it runs up to the required speed. Also, because of the constant rotation, full drive power at the output shaft is available almost immediately.

It should further be mentioned that a hazard exists if one or other of the drive motors 20 and 22 of FIG. 1 stalls. To this end there may be provided an overspeed device driven from shaft 14 for example to operate a brake. Also the frame on which carriage 42 moves would have limit switches mounted thereon for tripping at the limits of travel of the carriage to cause the drive to be stopped. Spring buffers or shock absorbers can also be mounted at these limits to cushion the cockpit motion. If the simple counterweight shown is replaced by a hydraulic or air-balancing system than some or all of the necessary cushioning could be built into the balancing system.

A further feature which is desirably added to an aircraft simulator system is the provision of transient effects such as buffeting and air turbulence. This can be effected by a source 29 in FIG. 1 for producing a signal of short period to modulate the reference signal from source 27. The modulation can be effected within or outside the comparator 26 which in the case of a simulator may be the computer controlling the simulation.

What I claim is:

1. A simulator system comprising a device for simulating a vehicle, support means to which said simulator device is mounted for motion with respect to said support means, and apparatus for positioning said simulator device with respect to said support means, said apparatus comprising first and second input shafts, an output shaft and a differential gear coupling said first and second shafts to said output shaft to rotate the latter at a rate dependent on the difference between the rates of rotation of said first and second input shafts, said simulator device being coupled to said output shaft to be driven thereby; means responsive to the movement of said output shaft or of said simulator device to derive a signal representing the angular position of said output shaft or position of said simulator device respectively; means responsive to said position-representing signal to compare the latter with a reference signal representing a desired position and derive an error signal from said comparison; and first and second drive means coupled to apply continuous drive to said first and second input shafts respectively, said first means being responsive to said error signal to control the rate of rotation of said first input shaft such that said output shaft or said simulator device adopts a position dependent on said reference signal.

2. Apparatus as claimed in claim 1, comprising means for providing perturbation signals and means for combining said perturbation signals with said reference signal to modulate the latter whereby said output shaft or said simulator device adopts a position dependent on the modulated reference signal.

3. Apparatus as claimed in 2, in which said comparison means comprises a computer for controlling the simulator system and said computer effects combination of said reference and perturbation signals.

4. Apparatus as claimed in claim 1, in which said first drive means comprises a hydraulic motor coupled to said first input shaft and a valve in the hydraulic circuit of said motor, the valve being arranged to receive said error signal to control the valve clearance in dependence upon the value of said error signal.

5. Apparatus as claimed in claim 1 comprising a pulley mounted on said output shaft and a cord drive engaging said pulley and fastened to said simulator device to transmit drive thereto.

6. Apparatus claimed in claim 1, in which said simulator device is coupled to said output shaft to rotate therewith.

7. Apparatus as claimed in claim 1 further comprising means coupled to said output shaft to derive a signal representing the rate of rotation of said output shaft, said comparison means being coupled to receive said rate signal and utilize same to modify the value of said error signal.